United States Patent
Meyers

(10) Patent No.: US 9,058,582 B1
(45) Date of Patent: Jun. 16, 2015

(54) METHOD FOR ESTABLISHING A SECURE PROTOCOL FOR PAIRING AN RFID TAG AND ASSET MONITORING DEVICE WITHIN A CONTAINER SUITE

(75) Inventor: Richard C. Meyers, Longboat Key, FL (US)

(73) Assignee: GlobalTrak, LLC, Sterling, VA (US)

( * ) Notice: Subject to any disclaimer, the term of this patent is extended or adjusted under 35 U.S.C. 154(b) by 635 days.

(21) Appl. No.: 13/462,771

(22) Filed: May 2, 2012

Related U.S. Application Data

(60) Provisional application No. 61/481,636, filed on May 2, 2011.

(51) Int. Cl.
*G06Q 10/08* (2012.01)
*G06F 15/173* (2006.01)
*G07C 9/00* (2006.01)

(52) U.S. Cl.
CPC ............ *G06Q 10/08* (2013.01); *B65D 2203/10* (2013.01); *G06F 15/173* (2013.01); *G07C 2009/0092* (2013.01)

(58) Field of Classification Search
CPC .. B65D 2203/10; G06Q 10/08; G06F 15/173; G07C 2009/0092
See application file for complete search history.

(56) References Cited

U.S. PATENT DOCUMENTS

| 7,378,960 | B1 * | 5/2008 | Binding et al. | 340/539.13 |
| 8,874,734 | B1 * | 10/2014 | Straz | 709/224 |
| 2006/0290491 | A1 * | 12/2006 | Wagner et al. | 340/539.26 |
| 2008/0117040 | A1 * | 5/2008 | Peel et al. | 340/539.16 |
| 2009/0201152 | A1 * | 8/2009 | Karr et al. | 340/545.6 |

* cited by examiner

*Primary Examiner* — Andrew Bee

(57) ABSTRACT

The present invention provides a method for automatically pairing a first container monitoring device equipped with a RFID reader and a second container in which stored data is embedded within an RFID tag or data storage device. The present invention provides a protocol for secure and supervised access between the first container monitoring device and the second container monitoring device as prescribed from an authorizing remote monitoring station.

10 Claims, 1 Drawing Sheet

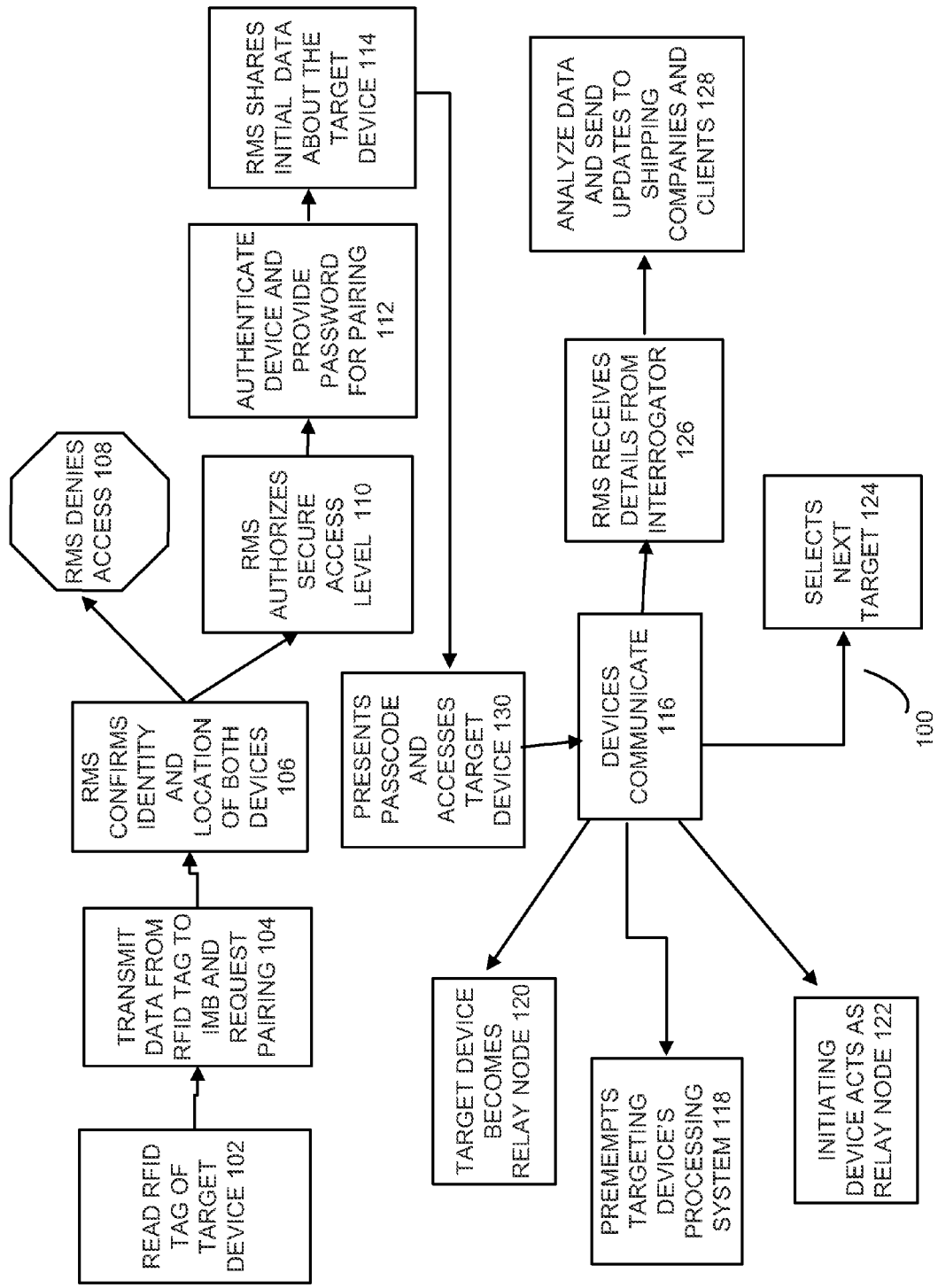

METHOD FOR ESTABLISHING A SECURE PROTOCOL FOR PAIRING AN RFID TAG AND ASSET MONITORING DEVICE WITHIN A CONTAINER SUITE

BACKGROUND AND FIELD OF THE PRESENT INVENTION

1. Field of the Present Invention

The present invention relates generally to a system for monitoring smart cargo containers and more specifically to providing a method for auto-pairing a RFID tagged container with an asset monitoring device. Further, the present invention provides a method for authorizing and confirming secure communications through a centralized data processing hub or remote monitoring station ("RMS") for normalizing system functions from container to container.

2. Background of the Invention

Radio Frequency Identification (RFID) tags are now a common and increasingly fundamental aspect of supply chain management. In conjunction with RFID tags. RFID readers are associated with smart containers and employed to access and track RFID tagged items.

Smart containers are shipping containers which include some sort of Asset Monitoring Device to monitor the interior status of the container. Such monitoring systems generally include: a sensing system for monitoring the contents of the container as well as the exterior environment of the container; an on-board processing system comprising a signal receiving element for receiving sensor data from the sensing system; a communication system; a memory for storing predetermined conditions; and a control element for analyzing received sensor data and declaring security alerts. An example of an exemplary smart container system is disclosed in U.S. Provisional Application 61/454,606 which is hereby incorporated by reference herein.

With the increasing sophistication and inter-networking of smart containers, there is a growing concern about rogue RFID readers gaining unauthorized access to data programmed into RFID tags. Further, there is growing concern regarding the security of communications between RFID readers and between smart containers themselves. Accordingly, there is a strong need for a new method to establish communications between smart container devices. More specifically, a method is needed to efficiently grant an interrogating RFID reader access to the data of a monitored container.

SUMMARY OF THE PRESENT INVENTION

To address the shortcomings of the prior art, the present invention provides a method for automatically pairing a first container monitoring device equipped with a RFID reader and a second container in which stored data is embedded within an RFID tag or data storage device. The present invention provides a protocol for secure access between the first container monitoring device and the second container monitoring device utilizing an authorizing remote monitoring station.

The accompanying drawings, which are incorporated in and constitute part of the specification, illustrate various embodiments of the present invention and together with the description, serve to explain the principles of the present invention.

BRIEF DESCRIPTION OF THE DRAWINGS

FIG. 1 shows a functional configuration in accordance with an embodiment or the present invention.

DESCRIPTION OF THE PREFERRED EMBODIMENTS

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," and the like as used herein, are defined as a sequence of instructions designed for execution on a computer system. A program, computer program, or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

With reference now to FIG. 1, a method according to an embodiment of the present invention will now be discussed. As shown in FIG. 1, the protocol to initiate automatic pairing between devices begins when an interrogating device reads the RFID tag of a target device 102. hereafter, the interrogator transmits the data from the RFID tag to the IMB requesting the pairing 104. Next, the RMS verifies the status, identity and the location of the interrogator device and the target device 106. If the RMS determines that pairing the devices is not authorized, access will be denied 108. In most cases in which authorization is allowed, the RMS will determine the level of access between devices and grant access 110. Upon granting access, the RMS will preferably update the authentication of the target device and provide pass codes for pairing to the interrogating device 112.

With access granted, the targeted device and the interrogating device may then conduct two-way communications 116 from which the interrogator may then extract the target-ing device details and sensor updates. The information may then be relayed to the RMS for backend analysis.

In some instances, it will be preferable for an interrogator device to access and direct a target device's processing system 118 to perform specific tasks. For instance, this action may be necessary as a means of conserving overall energy within the system or as a means of establishing a master coordinating system within a local network to connect into a larger meshed network. In other instances, the interrogating device may select another asset monitoring device as its next target for automatic pairing 124.

Once the devices complete the automatic pairing protocol, the function of the devices may include functioning as a relay node within a larger meshed network of devices. For example, if an asset monitoring device encounters obstructions in transmitting to the RMS, the monitoring device may seek other nearby asset monitoring devices to act as a relay node.

Additional steps in the protocol of automatically pairing devices within a container suite may include the RMS receiving updates and details from the interrogating device 126 to which the RMS applies backend analysis and provides information and updates as ongoing support to the shipping companies and other clients 128.

While the above descriptions regarding the present invention contain much specificity, these should not be construed as limitations on the scope, but rather as examples. Many other variations are possible. Accordingly, the scope should be determined not by the embodiments illustrated, but by the appended claims and their legal equivalents.

What is claimed is:

1. A method for establishing a secure protocol for allowing communications between at least a first container monitoring device and a second container with stored embedded data and a container monitoring device, the method comprising:
    reading stored embedded data pertaining to the second container;
    transmitting a first message from the first container monitoring device to a remote monitoring station requesting pairing with the second container based on information collected from embedded data pertaining to the second container;
    verifying identity and location of the second container;
    determining the level of authorized access between containers;
    authenticating the protocol for communicating with the second container;
    sending protocol procedures for pairing to the first container;
    implementing protocol procedures between devices;
    establishing communication between the first container monitoring device and the second container monitoring device;
    receiving a responsive signal and a message from the second container;
    relaying the message to the remote monitoring station; and
    applying back-end analysis to data.

2. The method of claim 1, where the stored embedded data is located on an RFID tag.

3. The method of claim 1, wherein the first container monitoring device acts as a relay node for transmitting a signal and a message from the second container monitoring device to remote monitoring station.

4. In a system including a first container monitoring device for monitoring the status of a first container, a second container monitoring device for monitoring the status of a second container, and a remote monitoring station for communicating with the first and second containers, a container monitoring device comprising:
    a sensor for detecting and reading stored embedded data;
    a transmission element, wherein the transmission element is configured to transmit a first message from the first container monitoring device to the remote monitoring station; and further wherein the transmission element is configured to transmit messages between the second container monitoring device and the remote monitoring station; and
    a processing element wherein the processing element is configured to initiate a message to the remote monitoring station based on the data received from the detected embedded data and further wherein the processing element is further configured to implement a protocol prescribed by the remote monitoring station for communicating with the second container monitoring device.

5. An apparatus for establishing a secure protocol for allowing communications between at least a first container monitoring device and a second container with stored embedded data and a container monitoring device, the apparatus comprising:
    a sensing element for reading stored embedded data;
    a transmitting element for transmitting a first message from the first container monitoring device to a remote monitoring station requesting pairing with the second container based on information collected from embedded data pertaining to the second container;
    a processing element wherein the processing element is configured to initiate a message to the remote monitoring station based on the data received from the detected embedded data and further wherein the processing element is further configured to implement a protocol prescribed by the remote monitoring station for communicating with the second container monitoring device;
    a communication element for establishing communication between the first container monitoring device and the second container monitoring device; and
    a receiving element for receiving a responsive signal and message from the second container.

6. The apparatus of claim 5, wherein the processing element is further configured to preempt the processing system of the second container's monitoring device.

7. The apparatus of claim 6, where the stored embedded data is located on an RFID tag.

8. The apparatus of claim 7, wherein the first container monitoring device acts as a relay node for transmitting a signal and a message from the second container monitoring device to a remote monitoring station.

9. The apparatus of claim 7, wherein the second container monitoring device acts as a relay node for transmitting a signal and a message from the first container monitoring device to another container monitoring device and/or remote monitoring station.

10. The apparatus of claim 7, wherein the first container monitoring device preempts the processing element of the second container monitoring device.

* * * * *